Patented Oct. 2, 1951

2,569,940

UNITED STATES PATENT OFFICE 2,569,940

INFRARED PHOSPHORS

Donald W. Lyon, Wilmington, Del., assignor to E. I. du Pont de Nemours and Company, Wilmington, Del., a corporation of Delaware No Drawing. Application December 22, 1949, Serial No. 134,603

9 Claims. (Cl. 252—301.4)

This invention relates to phosphorescent compounds, and more particularly to novel infrared-sensitive phosphors.

Those compounds which have hitherto comprised the usual infrared phosphors of commerce are various alkaline earth and other metal sulphides or selenides, suitably activated and excited. These substances have been valuable because of their strong light emission during irradiation with infrared energy, and because of their ability to store such excited energy for prolonged periods of time. Today, however, there have developed certain uses wherein infrared phosphors of weaker phosphorescence and of lesser ability to store energy are desired, and presently-known pigments are generally unsatisfactory therefor.

It is among the objects of this invention to provide a new group of infrared phosphors, particularly adapted for such uses. A particular object is to prepare infrared-stimulable phosphors which emit a weaker light than do conventional metal sulphide or selenide phosphors, and which also retain excited energy for a more limited time interval. Other objects and advantages of the invention will be apparent from the ensuing description thereof.

The above and other objects are realized by my invention, wherein certain oxy-compounds are activated in a particular manner, providing a novel class of infrared phosphors. My process comprises forming an oxidic compound or double oxide of calcium with at least one element adapted to form a white acidic oxide selected from the group consisting of aluminum, molybdenum, silicon, tin, titanium and vanadium, and activating such oxy-compound with samarium and with manganese. To effect this activation, the oxidic material is heated with the two activators, samarium and manganese, under non-reducing conditions whereby reduction of the oxides is prevented. The product of my process comprises an infrared-stimulable phosphor consisting essentially of a double oxide of calcium with one or more of the elements aluminum, molybdenum, silicon, tin, titanium and vanadium, activated by samarium and manganese.

According to one specific embodiment of my invention, I intimately commingle, in dry or wet state and in substantially chemically-equivalent amounts, an oxide of calcium and of the other element or elements desired to be combined; or I may commingle compounds of such materials which on heat treatment and/or oxidation will result in the double oxide sought. To such mixture I add a samarium activator and a manganese activator, intimately incorporating them in the mass. This material is then heated under non-reducing or oxidizing conditions at a temperature of at least 800° C. and preferably between 800° C. and 1300° C. The resulting infrared-sensitive phosphor comprises a calcium compound such as calcium aluminate, calcium molybdate, calcium silicate, calcium stannate, calcium titanate, calcium vanadate or mixtures thereof, activated with samarium and manganese.

It is important to the success of my invention and the development of the desired infrared-stimulable phosphors that the base material of such phosphors comprise a double oxide of calcium with at least one of the group of elements specifically noted above, and that such base material be activated with samarium and manganese. Oxidic compounds of calcium with aluminum, molybdenum, silicon, tin, titanium and vanadium are generally called "double oxides," and specifically named calcium aluminate, calcium molybdate, calcium silicate, etc. It is generally thought that their formulae are more correctly written, e. g., $3CaO.Al_2O_3$, $3CaO.MoO_3$, $2CaO.SiO_2$, etc. In practicing my process, one may employ as raw materials any compounds from which heating and/or oxidation will form such double oxides. For instance, as hereinbefore mentioned, oxides of calcium, such as lime or a per-oxide, as well as oxides of the other element or elements may be used; or their carbonates may be calcined to yield gaseous $CO_2$ and the desired double oxide; or chlorides of the elements and the like may be utilized.

These special base materials must be activated with the aforementioned particular pair of activating agents, namely, samarium and manganese. These two must be employed together, as the absence of either one negates infrared activity. The concentrations of these two special activators are important in determining the quality of the products; those proportions generally useful to effect activation are commonly referred to as "activator amounts." The double oxide base should usually be treated with between 0.001 and 0.01% by weight of samarium and with between 0.01 and 1.0% by weight of manganese. It will often be found that samarium in the amount of 0.002 to 0.006% by weight, coupled with manganese in the amount of 0.05 to 0.5%, constitutes a generally satisfactory and preferred activator content for most commercially useful phosphors.

It is customary in the art to refer to activating agents as simply the elements, i. e., as "samarium"

and "manganese"; however, such materials are in fact almost always employed in the form of chemical compounds. Thus, samarium and manganese may be added in elementary form, or as oxides, or as generally any organic or inorganic salt. Among particularly useful compounds of these elements may be mentioned their sulphates, nitrates, chlorides, chlorates, acetates, and the like. It should be understood that references in this specification and the appended claims to "samarium" or "manganese" are meant to include compounds as well as the elements.

It is important that the activating agents and the phosphor base material be intimately mixed, and any method for such admixture is satisfactory. Thus, the activators and the base material may simply be mixed dry; or water solutions of salts of the activators may be added to the dry base, the mass then being milled to form a paste or slurry. Following intimate incorporation of the activating agents with the base by some such method, the material must be heat-treated. It is this heat treatment of the oxidic base in the presence of these two activators which develops the specific infrared-sensitivity. For this calcination treatment, it is generally best to use a temperature of at least 800° C. and up about 1300° C., while between 1050° C. and 1150° C. is often a preferred range.

As previously discussed, one may employ as raw materials either the oxides of calcium and the other element or elements, or compounds which will produce the double oxide after heating and/or oxidation. The desired double oxide may be first prepared by known means, and samarium and manganese subsequently incorporated and calcined therewith. It is frequently more feasible economically, however, to utilize other compounds of calcium and the second element, such as the carbonates or chlorides or the like, and to add the two activating agents thereto at the same time; one calcination treatment will then serve to produce the desired double oxide and at the same time to activate it. It is important that the atmosphere within the calcination chamber be at least non-reducing, so that the oxy-compound or compounds will not be affected; and when raw materials are chosen which require oxidation to form a double oxide, an oxidizing atmosphere, such as of air or oxygen, should prevail in the chamber.

The time of heat treatment may vary materially, being interdependent with various other operating factors. If the particular raw materials employed are in the form of compounds requiring heat and/or oxidation to develop the double oxide, opportunity for such development must be given, as well as opportunity for activation. The temperature of calcination and other conditions obtaining in the operation will also be of weight; but it may generally be said that from fifteen minutes to a few hours will be sufficient calcining time, and between one-half and two hours will often be fully satisfactory. As in prior art methods for preparing phosphors, a fluxing agent may be used, if desired; however, it does not appear to accelerate or otherwise aid calcination in my process so materially as it does in prior methods.

The following examples are given simply in illustration of my invention and not at all in limitation of its scope:

*Example I*

22.23 parts by weight of $CaCO_3$, 7.55 parts by weight of $Al_2O_3$, and 0.6 part of a fluxing agent (LiF) were mixed together in the dry state. To this were added a water solution of manganous chloride (providing 0.02 part by weight of Mn), and a solution of samarium chloride (containing 0.0008 part of Sm). Sufficient water was included to form a thin slurry of the mass, which was thoroughly agitated. This material was subsequently dewatered and dried at 105° C. It was then calcined in a silica crucible at 1100° C. for thirty minutes, in a non-reducing atmosphere. The product was a white powder, shown by X-ray diffraction to be about $5CaO.3Al_2O_3$, calcium aluminate. This material was excited by exposure for eight seconds to a low-pressure mercury lamp with no filter (containing 1850 Å. radiation), and, in a second experiment, by exposure for ten seconds to the same lamp with a filter (2537 Å.). After each of these excitations, the powder was irradiated with near infrared radiation, using a 100-watt tungsten lamp equipped with a filter to remove visible light. During such stimulation the material excited at either 1850 Å. or 2537 Å. exhibited an orange phosphorescence; such phosphorescence persisted for only a relatively short period.

*Example II*

A calcium molybdate phosphor was prepared by commingling 10.78 parts by weight of CaO, 9.22 parts by weight of $MoO_3$, 0.002 part of Mn and 0.0008 part of S. This mixture was calcined at 1000° C. for one hour. The product phosphor was off-white in color, and when suitably excited by ultraviolet and irradiated by infrared, emitted a red-orange light.

*Example III*

CaO in the amount of 13.03 parts by weight and $SiO_2$ at 6.97 parts by weight were pasted by milling with a water solution of $MnCl_2.4H_2O$ (0.02 part of Mn) and a water solution of samarium chloride to give forty parts per million of Sm. The paste was calcined at 1150° C. for fifteen minutes; and the product, calcium silicate, was a white powder, exhibiting a purple infrared phosphorescence when excited and stimulated as in Examples I and II.

*Example IV*

Calcium titanate, $CaO.TiO_2$, was separately prepared and then treated with 0.005% by weight of samarium and 0.2% of Mn at a temperature of 1050° C. for forty-five minutes. The product phosphor was a yellowish powder, excited by ultraviolet and stimulated by infrared energy, like the products of the previous examples.

It is by now apparent that my invention provides a new method for preparing novel infrared-stimulable phosphors, which substances are characterized by the relatively weak phosphorescence and short energy-storage period which are presently desired primarily in military circles. Whereas the usual infrared phosphors of commerce have hitherto comprised only various sulphides and selenides, I have now developed a new class, easily prepared from readily available and familiar base materials.

I claim as my invention:

1. A process for the production of an infrared-sensitive phosphor which comprises heating together in an oxidizing atmosphere, at temperatures ranging from 800° C.–1300° C. and until infrared sensitivity is developed, from 0.001 to 0.01% by weight of samarium, between 0.01 and 1.0% by weight of manganese, and an oxide of calcium with a stoichiometric proportion of a compound selected from the group consisting of an oxide of an element from the group aluminum, molybdenum, silicon, tin, titanium and vanadium, and a compound of said elements which yields an oxide during said heating.

2. An infrared-stimulable phosphor consisting essentially of a calcium compound selected from the group consisting of calcium aluminate, calcium molybdate, calcium silicate, calcium stannate, calcium titanate and calcium vanadate, activated with from 0.002 to 0.006% by weight of samarium and between 0.005 and 0.05% by weight of manganese.

3. An infrared-stimulable phosphor consisting essentially of calcium aluminate activated with between 0.002 and 0.006% by weight of samarium and from 0.005 to 0.05% by weight of manganese.

4. An infrared-stimulable phosphor consisting essentially of calcium molybdate activated with between 0.002 and 0.006% by weight of samarium and from 0.005 to 0.05% by weight of manganese.

5. An infrared-stimulable phosphor consisting essentially of calcium silicate activated with between 0.002 and 0.006% by weight of samarium and from 0.005 to 0.05% by weight of manganese.

6. A process for the production of an infrared-sensitive phosphor which comprises intimately mixing substantially chemically equivalent amounts of an oxide of calcium with a compound selected from the group consisting of an oxide of an element from the group aluminum, molybdenum, silicon, tin, titanium and vanadium, and a compound of said elements which breaks down in heating to form an oxide of said elements, between 0.001 and 0.01% by weight of samarium and between 0.01 and 1.0% by weight of manganese, and heat-treating said mixture in an oxidizing atmosphere at a temperature of from 800° C. to 1300° C. and continuing said heating until infrared sensitivity is developed.

7. A process for the production of an infrared-sensitive phosphor which comprises heating together, at a temperature of between 800° C. and 1300° C. and under non-reducing conditions, an intimate mixture of substantially chemically equivalent amounts of calcium oxide, an oxide of an element selected from the group consisting of aluminum, molybdenum, silicon, tin, titanium and vanadium, from 0.001 to 0.01% by weight of samarium activator and between 0.01 and 0.1% by weight of manganese activator, and continuing said heating until desired infrared sensitivity is developed in the resulting reaction product.

8. A process for the production of a infrared-sensitive phosphor which comprises mixing together substantially chemically equivalent amounts of calcium oxide and a compound selected from the group consisting of an oxide and a compound of an element from the group aluminum, molybdenum, silicon, tin, titanium and vanadium, said latter compound being capable on oxidation of yielding the corresponding oxide, adding to said mixture between 0.001 and 0.01% by weight of samarium activator and between 0.001 and 0.1% by weight of manganese activator, and simultaneously oxidizing and activating the mass by heating the same in an oxidizing atmosphere at between 800° C. and 1300° C. until infrared sensitivity is developed in the resulting reaction product.

9. A method for producing an infrared-sensitive phosphor which comprises intimately mixing substantially stoichiometric proportions of an oxide of calcium with a compound selected from the group consisting of an oxide of an element selected from the group consisting of aluminum, molybdenum, silicon, tin, titanium and vanadium and a compound of said elements which on oxidation yields the corresponding oxide, adding to said mixture between 0.02 and 0.006% by weight of samarium and from 0.005 to 0.05% by weight of manganese, and heating the resulting mixture in a non-reducing atmosphere at temperatures ranging from 1050–1150° C. until infrared sensitivity is developed.

DONALD W. LYON.

REFERENCES CITED

The following references are of record in the file of this patent:

UNITED STATES PATENTS

| Number | Name | Date |
|---|---|---|
| 2,447,322 | Fonda | Aug. 17, 1948 |
| 2,462,547 | Pitha | Feb. 22, 1949 |
| 2,470,451 | Wood | May 17, 1949 |
| 2,522,074 | Urbach | Sept. 12, 1950 |